United States Patent
Price et al.

(10) Patent No.: US 7,876,058 B2
(45) Date of Patent: Jan. 25, 2011

(54) SYSTEMS AND METHODS FOR BACKLIGHTING IMAGE DISPLAYS

(75) Inventors: Erin L. Price, Pflugerville, TX (US); Asim M. Siddiqui, Austin, TX (US); James A. Yasukawa, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 742 days.

(21) Appl. No.: 11/821,560

(22) Filed: Jun. 22, 2007

(65) Prior Publication Data
US 2008/0315785 A1 Dec. 25, 2008

(51) Int. Cl.
H05B 37/02 (2006.01)
G09G 3/10 (2006.01)

(52) U.S. Cl. ............... 315/291; 315/169.3; 315/312; 345/102

(58) Field of Classification Search ........... 315/209 R, 315/224, 276, 291, 307, 160, 169.1, 169.3, 315/282, 308, 311, 312, 318; 345/47, 48, 345/76, 77, 84, 87, 102, 204, 690
See application file for complete search history.

(56) References Cited

U.S. PATENT DOCUMENTS

| | | | |
|---|---|---|---|
| 6,784,627 B2 * | 8/2004 | Suzuki et al. | 315/291 |
| 6,943,770 B2 | 9/2005 | Garcia et al. | |
| 7,141,941 B2 | 11/2006 | Lyle, Jr. et al. | |
| 7,151,346 B2 | 12/2006 | Sanchez | |
| 7,394,448 B2 * | 7/2008 | Park et al. | 345/102 |
| 7,443,107 B2 * | 10/2008 | Shannon et al. | 315/224 |
| 2004/0008280 A1 | 1/2004 | Verdun | |
| 2004/0178781 A1 | 9/2004 | Lin | |
| 2005/0099144 A1 | 5/2005 | Sanchez | |
| 2005/0270281 A1 | 12/2005 | Moon et al. | |
| 2005/0285546 A1 | 12/2005 | Price et al. | |
| 2006/0049959 A1 | 3/2006 | Sanchez | |
| 2006/0113926 A1 * | 6/2006 | Lin | 315/291 |
| 2006/0120082 A1 | 6/2006 | Choo et al. | |
| 2006/0274023 A1 | 12/2006 | Sultenfuss et al. | |
| 2007/0002580 A1 | 1/2007 | Ahn et al. | |
| 2008/0067958 A1 * | 3/2008 | Inoue et al. | 315/312 |

OTHER PUBLICATIONS

Dell Technical Support Documentation, "Using the Display" Printed From the Internet Apr. 20, 2007, 6 pgs.
Dell Technical Support Documentation, "Drivers & Downloads", Printed From the Internet Apr. 20, 2007, 5 pgs.
MPS, "Full Bridge CCFL Controller", The Future of Analog IC Technology, MP1038, Rev. 1.9w. 2005, 1 pg.

(Continued)

Primary Examiner—Jacob Y Choi
Assistant Examiner—Jimmy T Vu
(74) Attorney, Agent, or Firm—O'Keefe, Egan, Peterman & Enders LLP

(57) ABSTRACT

Systems and methods for backlighting an image display by independently driving multiple backlights for the display. The display may be, for example, a LCD display panel of a portable information handling system such as a battery-powered notebook computer that employs two or more cold cathode fluorescent lamps (CCFLs) for backlighting the LCD display. The multiple backlights may be independently driven, for example, using a common inverter that is capable of independently driving two or more backlight lamps, or by driving each backlight lamp with a separate inverter.

35 Claims, 7 Drawing Sheets

OTHER PUBLICATIONS

Maxim Integrated Products, "Low-Cost, SMBus" CCFL Backlight Contoller, Max8759, Rev. 1; 2006, 31 pgs.
Texas Instruments, "Highly Efficient Phase Shift Full Bridge CCFL Controller", TPS68000, Feb. 2006, 23 pgs.
Maxim Integrated Products, "8-Channel Cold-Cathode Fluorescent Lamp Controller", DS3988, Rev. 0, 2005, 23 pgs.
Maxim Integrated Products, "Dual Channel Automotive CCFL Controller", DS3882, Rev. I, 2006, 30 pgs.

* cited by examiner

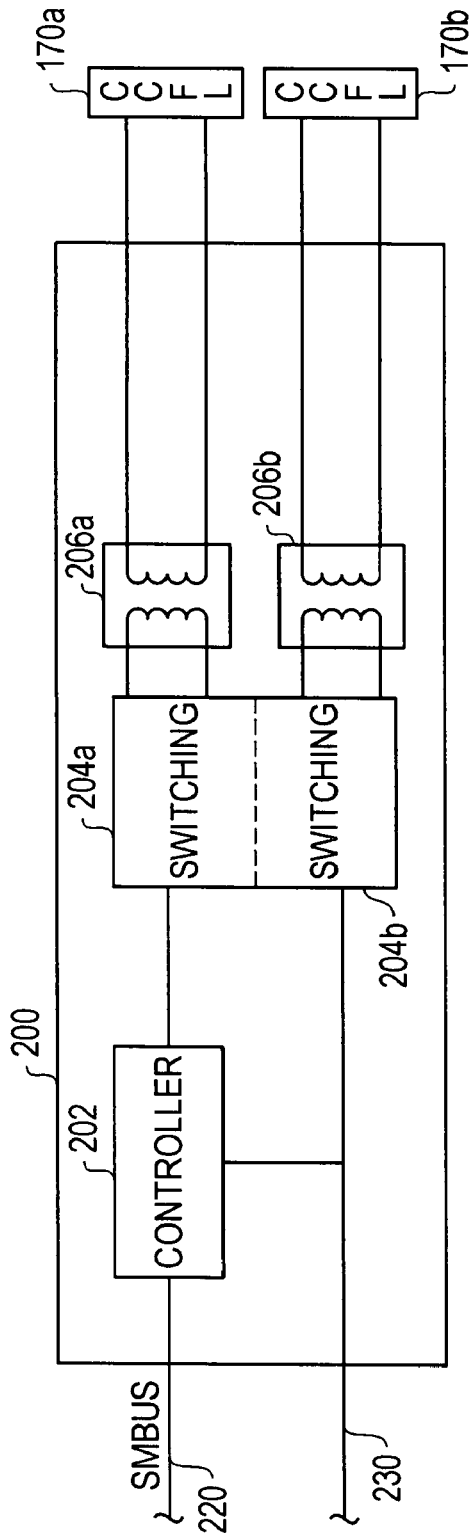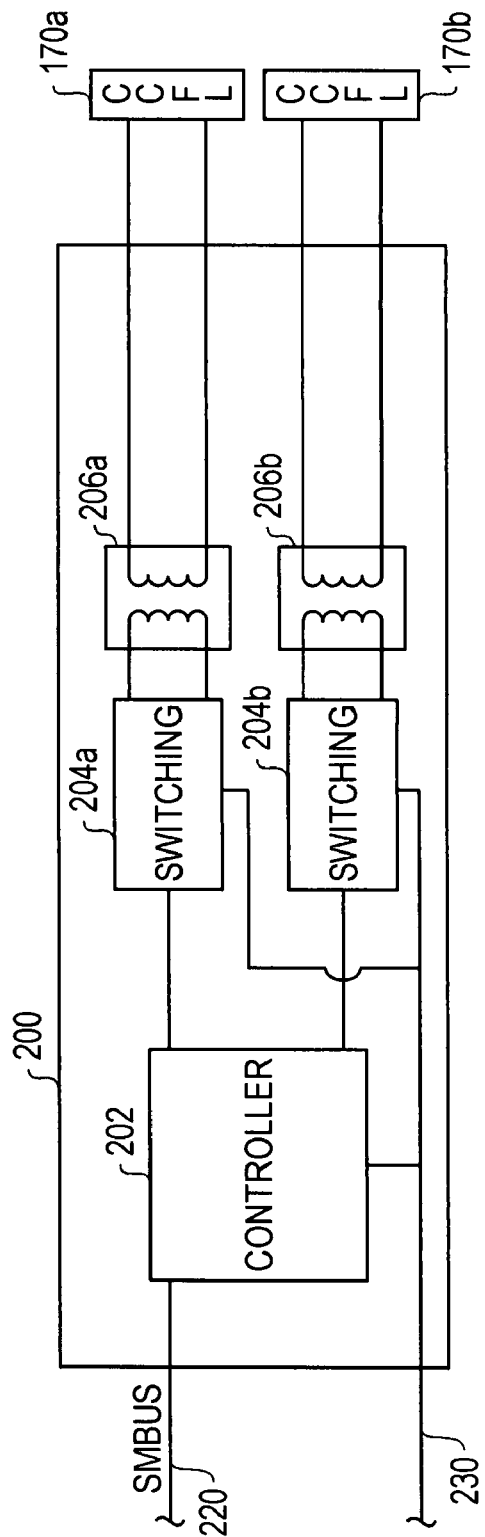
FIG. 3
FIG. 4

| | 14.1"WXGA | | |
|---|---|---|---|
| | Module spec. | Brightness | Gain* |
| Basic (141W1) | = 2.0mm thickness Prism Light Guide Pipe (LGP)<br>= 1.8mm Dia. CCFL<br>= Lamp Current (IL)=6.0mA<br>= Thickness : 5.5mm thickness max<br>= Y Dimension=205.5mm<br>= no PCF | 220nit | 1.0 |
| Y-Stack | = 2.0mm thickness Prism Light Guide Pipe (LGP)<br>= 1.8mm Dia. CCFL<br>= Lamp Current (IL)=6.0mA<br>= Thickness : 5.5mm thickness max<br>= Y Dimension=208.5mm<br>= no PCF | 215nit | 0.98 |
| | | 170nit | 0.78 |
| | | 330nit | 1.5 |
| | | Optional Applications — Bright reflector 360 nit / PCF 450 nit | |
| Z-Stack | = 5.4mm thickness Prism Light Guide Pipe (LGP)<br>= 1.8mm Dia. CCFL<br>= Lamp Current (IL)=6.0mA<br>= Thickness : 9.0mm thickness max<br>= Y Dimension=205.5mm<br>= no PCF | 440nit | 2.00** |

\* All gain values are the results of actual mock up sample measurements except Z-stack data
\*\* Z-stack gain is the estimate value compared with the other Z-stack models (15.4", 17.0")

*FIG. 6*

SYSTEMS AND METHODS FOR BACKLIGHTING IMAGE DISPLAYS

FIELD OF THE INVENTION

This invention relates generally to image display and, more particularly, to backlighting image displays.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Display devices for information handling systems include liquid crystal display (LCD) display devices that employ cold cathode fluorescent lamp (CCFL) backlights for lighting the display. Current portable information handling systems, such as battery-powered notebook computers, typically utilize LCD display devices having a single CCFL to provide a display brightness of about 150 nits (candelas per square meter) from a single lamp, which is considered acceptable for indoor viewing conditions. However, to adapt current LCD devices for outdoor viewing conditions, a display brightness of greater than about 400 nits from two lamps is desirable. To achieve this greater panel brightness, two CCFL bulbs are often employed for backlighting, e.g. using Y-stack or Z-stack lamp configurations. However, maintaining such a brightness level compromises battery life of a portable information handling system. In this regard, two CCFL lamps effectively doubles the power requirement for a LCD panel (e.g., requiring about 14 watts as compared to 7 watts), dramatically reducing system run time. Even at lower brightness levels, a two lamp system has lower efficiency, consuming more power than a single lamp operating at the same brightness level. Although light emitting diode (LED), RGB LED and white LED backlighting technologies are emerging for notebook computer use, these technologies present significant challenges to overcome such as cost, performance, reliability, and complexity. Even as technical issues with LED backlighting technology are resolved, the high cost of LED technology means that CCFL backlights will remain the predominant LCD backlighting technology for some time to come.

SUMMARY OF THE INVENTION

Disclosed herein are systems and methods for backlighting a transmissive image display by independently driving multiple backlights for the display. The display may be, for example, a LCD display panel of a portable information handling system such as a battery-powered notebook computer that employs two or more CCFLs for backlighting the LCD display. In such an embodiment, the disclosed systems and methods may be implemented to independently drive the multiple CCFLs using a common inverter that is capable of independently driving two or more CCFLs, or by driving each CCFL with a separate inverter. In either case, the two or more CCFLs may be driven interpedently during normal (i.e., non-failure condition) operating conditions, e.g., so that one lamp may be turned off when it is not needed and turned back on when it is needed again, and/or so that that the two or more lamps may be selectably driven at varying and different brightness levels from each other and, in one exemplary embodiment, in a manner so as to allow significant efficiency improvements. Further the disclosed systems and methods may be advantageously implemented in one exemplary embodiment to independently drive the multiple CCFLs using AC current provided for each CCFL from either a single common inverter or from multiple separate inverters, but in either case without modification of the AC current provided by additional current control circuitry that is separate from or external to the inverter/s.

In the practice of the disclosed systems and methods, multiple lamps may be independently driven to backlight a display panel using any suitable combination of one or more inverters and using digital and/or analog control. For example, in one exemplary embodiment, two or more separate inverters each having digital interfaces and internal controllers (e.g., analog or digital controllers) may be provided that have different system management bus (SMBus) addresses. Each inverter having a digital interface may be coupled to a backlight lamp and may be controlled to independently drive the coupled backlight lamp on and off based on digital command signals received by its respective inverter controller across the SMBus. In another exemplary embodiment, two or more inverters having separate enable pins may each be coupled to a backlight lamp, and each of the inverters controlled to independently drive its respective backlight lamp on and off by appropriate input via a separate enable pin.

In another embodiment, a single inverter device may be configured to independently drive multiple backlight lamps for a display panel. For example, a single inverter may be provided capable of independently driving two or more coupled backlight lamps, but otherwise sharing drive section components (e.g., controller, transformer and/or switching transistors), in a master/slave arrangement that utilizes a reduced number of components. Alternatively, a single inverter device may be configured with separate drive section components for each of two or more backlight lamps so that the inverter will remain operational even in the event of a fault or failure of one of the backlight lamps.

Using the disclosed systems and methods, battery life of a battery-powered portable information handling system may be extended in one exemplary embodiment by operating a multiple-lamp display using only a portion of the backlight lamps of the display when a reduced brightness level is acceptable to a user of the system, when remaining battery capacity has dropped below a threshold level (e.g. threshold voltage level), and/or when the system is operating solely on battery power. For example, in one exemplary embodiment a battery-powered portable information handling system may be configured with a power scheme that automatically operates the system display with a reduced number of backlight lamps when the system is in battery optimized mode (e.g., when operating on battery power), but at the same time allowing a user the option to override this battery savings feature and enable the full range of display panel brightness that lighting an increased number of the multiple backlight lamps will accommodate, e.g., using a system configuration tool and/or hot keys. In such an embodiment, the system may be configured to automatically provide a user with the increased (e.g., full) brightness range available by lighting an increased number (e.g., all) of the multiple backlight lamps when the system is switched from battery to AC power.

In another embodiment, an information handling system that includes a multiple-lamp display may be configured (e.g., pre-configured when assembled at the factory) to operate the system display with a selected portion of the available display lamps to fit a usage profile of the end-user (e.g., customer). For example, an information handling system may be pre-programmed with multiple standardized display brightness profiles that correspond to types of intended usage and display brightness levels for each type of usage, e.g., to light a larger number or increased portion of the available display backlight lamps to achieve higher display brightness levels for computer gaming profile or outdoor usage profile, to light a smaller number or reduced portion of backlight lamps to achieve lower display brightness levels for indoor usage profile or heavy mobile battery-usage profile. In such a case, the desired or appropriate display brightness profile may be selected at the factory when the information handling system is assembled for the given customer, e.g., based on usage information provided by the customer during the information handling system ordering process. It will be understood that such a profile may be so selected in one exemplary embodiment to permanently limit the number of lamps and display brightness (i.e., such that a user cannot override the profile), or an information handling system may be alternatively configured in another exemplary embodiment to allow a user to change the display brightness profile, e.g., by selection between two or more pre-programmed display brightness profiles using a graphical user interface.

In another exemplary embodiment, an information handling system may be configured to automatically switch between a reduced number of backlight lamps and an increased number (e.g., all) of available backlight lamps depending on desired brightness, regardless of whether the system is being supplied with AC or battery power. In this regard, higher brightness levels may be provided when desired or needed to fit given operating environments to which a display is exposed, e.g., when a display is exposed to indoor or outdoor high brightness environments, when higher display brightness levels are desired for particular applications such as computer gaming applications or for the display of particular types of graphic information, or for any other condition/s in which a higher brightness level is desired. Examples of high brightness environments include, but are not limited to, environments where a display is exposed to bright artificial office or other type/s of artificial lighting, when a display is operated outdoors in sunlight, etc.)

In yet another exemplary embodiment, an optional ambient light sensor (ALS) may be employed to detect the brightness level of the environment in which the user and display is operating, and the system configured to provide increased brightness range from the display when the user is operating in a high brightness environment, and to provide light from a reduced number of the available backlight lamps to increase battery life when the ALS detects the user to be in a lower ambient condition such as indoor lighting. In yet another exemplary embodiment, a display brightness light sensor (e.g., photo diode) may be provided that is configured to monitor brightness of a display itself, and an information handling system may be configured to adjust brightness of the display in real time based on feedback signal of the brightness level monitored by the display brightness light sensor (e.g., to increase display brightness when the detected display brightness is less than a desired brightness level set point and/or to decrease display brightness when the detected display brightness is greater than a desired brightness level set point).

In one respect, disclosed herein is an information handling system, including: a transmissive display panel; multiple backlight lamps configured to light the transmissive display panel; inverter circuitry configured to convert DC current to AC current, the inverter circuitry including a first transformer coupled to provide the AC current to a first one of the multiple backlight lamps and a second transformer coupled to provide the AC current to a second one of the multiple backlight lamps; and at least one processor configured to control the inverter circuitry to cause the first transformer of the inverter circuitry to provide AC current to drive the first one of the multiple backlights in a manner that is independent of AC current provided by the second transformer of the inverter circuitry to drive the second one of the multiple backlight lamps.

In another respect, disclosed herein is a method of operating an information handling system, including: providing an information handling system that includes a transmissive display panel, and multiple backlight lamps configured to light the transmissive display panel; and selectably providing AC current to drive a first one of the multiple backlight lamps in a manner that is independent from providing AC current to drive a second one of the multiple backlight lamps based on at least one of a remaining capacity of a battery supplying DC current to the information handling system, based on whether or not DC current is provided to the information handling system by an AC adapter device, based on a detected brightness level of the ambient light environment in which the information handling system is operating, based on a monitored feed-back brightness level of said transmissive display, based on a pre-programmed display brightness profile, or a combination thereof.

In another respect, disclosed herein is a method of operating an information handling system, including: providing an information handling system that includes a transmissive display panel, multiple backlight lamps configured to light the transmissive display panel, a first transformer coupled to a first one of the multiple backlight lamps, a second transformer coupled to a second one of the multiple backlight lamps, and at least one processor; and independently driving the first one of the multiple backlight lamps by using the processor to cause the first transformer to provide AC current from the first transformer to drive the first one of the multiple backlights in a manner that is independent of AC current provided by the second transformer to drive the second one of the multiple backlight lamps.

In another respect, disclosed herein is an information handling system, including: a transmissive display panel; multiple backlight lamps configured to light the transmissive display panel; inverter circuitry configured to convert DC current to AC current, the inverter circuitry including a transformer coupled to provide the AC current to a first and a second one of the multiple backlight lamps and a switch coupled between the transformer and the second one of the multiple backlight lamps, the switch configured to selectably permit and prevent flow of AC current from the transformer to the second one of the multiple backlight lamps when AC current is flowing from the transformer to the first one of the multiple backlight lamps; and at least one processor configured to control the switch of the inverter circuitry to cause AC current to drive the second one of the multiple backlights in a manner that is independent of AC current provided by the transformer of the inverter circuitry to drive the first one of the multiple backlight lamps.

In another respect, disclosed herein is a method of operating an information handling system, including: providing an information handling system that includes a transmissive display panel, multiple backlight lamps configured to light the transmissive display panel, an inverter that comprises a transformer coupled to first and second ones of the multiple backlight lamps and a switch coupled between the transformer and the second one of the multiple backlight lamps, and at least one processor; and independently driving the first one of the multiple backlight lamps by using the processor to control the switch of the inverter circuitry to selectably permit and prevent flow of AC current from the transformer to the second one of the multiple backlight lamps when AC current is flowing from the transformer to the first one of the multiple backlight lamps to drive the second one of the multiple backlights in a manner that is independent of AC current provided by the transformer of the inverter circuitry to drive the first one of the multiple backlight lamps.

BRIEF DESCRIPTION OF THE DRAWINGS

FIG. 3 is a simplified block diagram of a single inverter as it may be configured to independently drive multiple CCFL backlights according to one exemplary embodiment of the disclosed systems and methods.

FIG. 4 is a simplified block diagram of a single inverter as it may be configured to independently drive multiple CCFL backlights according to one exemplary embodiment of the disclosed systems and methods.

FIG. 6 illustrates three different CCFL lamp configurations and tested or estimated characteristics of same when employed in a 14.1" WXGA notebook computer LCD display.

DESCRIPTION OF ILLUSTRATIVE EMBODIMENTS

Figure 1A:
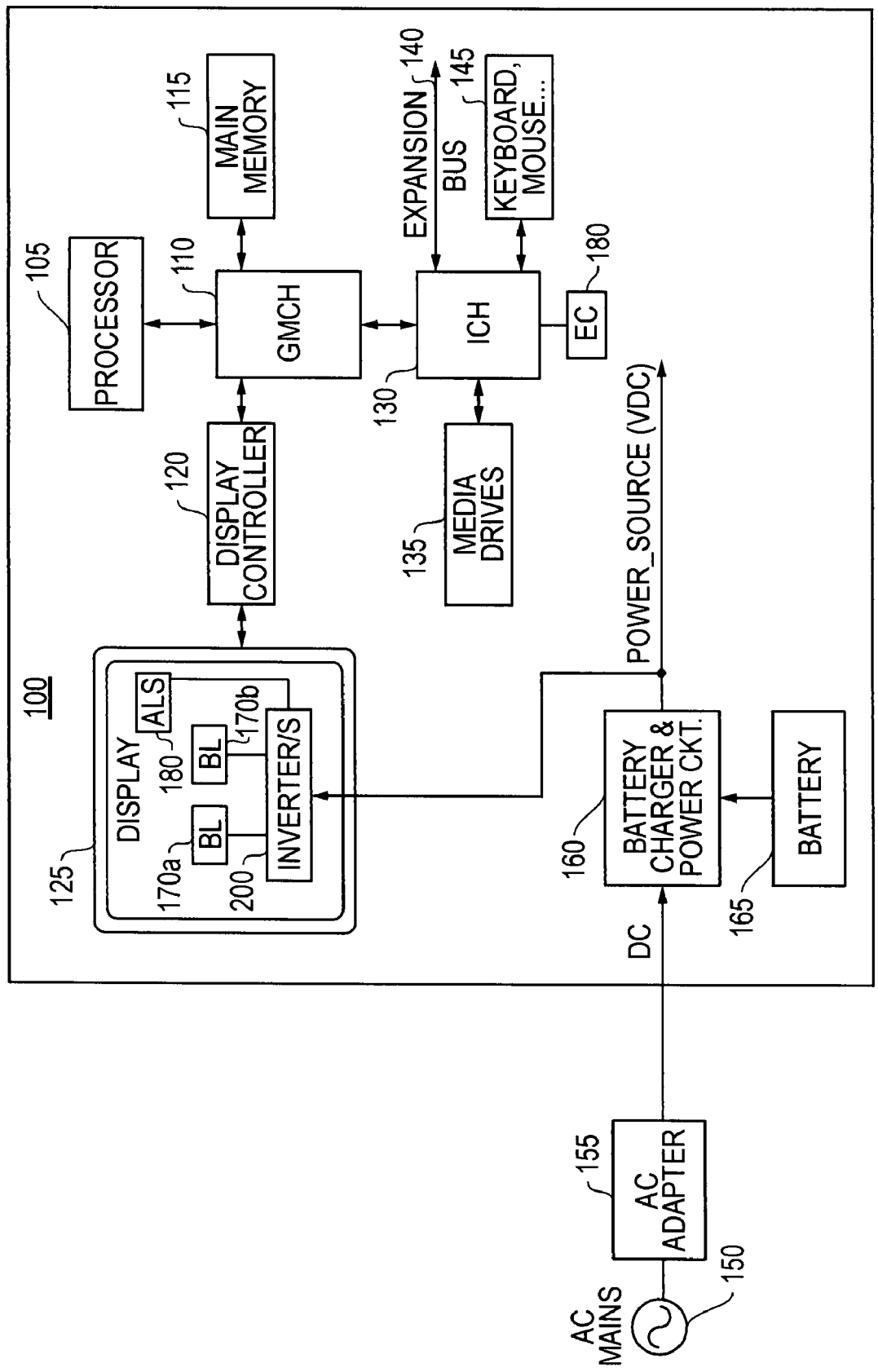
FIG. 1A is a simplified block diagram of an information handling system configured according to one exemplary embodiment of the disclosed systems and methods.

FIG. 1A is a block diagram of an information handling system 100 as it may be configured according to one exemplary embodiment of the disclosed systems and methods. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

As shown in FIG. 1A, information handling system 100 of this exemplary embodiment includes a processor 105 such as an Intel Pentium series processor, an Advanced Micro Devices (AMD) processor or one of many other processors currently available. A graphics/memory controller hub (GMCH) chip 110 is coupled to processor 105 to facilitate memory and display functions. System memory 115 and a display controller 120 are coupled to GMCH 110. A display 125 may be coupled to display controller 120 to provide visual images to the user. An I/O controller hub (ICH) chip 130 is coupled to GMCH chip 110 to facilitate input/output functions for the information handling system. Media drives 135 are coupled to ICH chip 130 to provide permanent storage to the information handling system. An expansion bus 140 is coupled to ICH chip 130 to provide the information handling system with additional plug-in functionality. Expansion bus 140 may be a PCI bus, PCI Express bus, SATA bus, USB or virtually any other expansion bus. Input devices 145 such as a keyboard and mouse are coupled to ICH chip 130 to enable the user to interact with the information handling system. An embedded controller (EC) 180 running system BIOS is also coupled to ICH chip 130.

In this particular embodiment, information handling system 100 is coupled to a source of AC power, namely AC mains 150. An AC adapter 155 is coupled between AC mains 150 and a battery charger/power circuit 160 to provide information handling system 100 with a source of DC power to supplement DC power provided by battery 165. As shown, display 125 includes one or more inverter devices 200 which are coupled to multiple backlights 170a and 170b. Inverter/s 200 are configured to take relatively low voltage DC and convert it to relatively high voltage AC which has sufficient amplitude to drive backlights 170a and 170b, e.g., so that each of backlights 170a and 170b may be selectively lit and/or lit at different illumination levels in a manner that is independent of the other backlight. In one exemplary embodiment, inverter/s 200 may be capable of operating in an input voltage range of approximately 6.5 to approximately 21 volts DC and generating an output voltage of approximately 1000 volts AC, although other DC and/or AC voltages are possible in other embodiments. Although two backlights are present in this embodiment, it will be understood that three or more backlights may be present and driven independently of each other in alternative embodiments.

In the illustrated embodiments shown herein, backlights 170a and 170b are CCFL lights, although it will be understood that the disclosed systems and methods may be implemented as described herein to use one or more inverters to independently drive any other type/s of backlight lamps that are suitable for receiving power from inverter circuitry, e.g., hot cathode fluorescent lamps (HCFL), external electrode fluorescent lamps (EEFL), etc.

FIG. 1A also illustrates optional an optional ambient light sensor 180 as it may be integrated as part of display 125 for providing a real-time signal representative of ambient light conditions to which display 125 is currently exposed. In such a configuration, ALS 180 may be employed to detect the brightness level of the environment in which the user and display is operating and provide this information to controller components of inverter devices 200 of information handling system 100. Alternatively, ALS 180 may provide detected brightness level signal to other processing component/s of information handling system 100, e.g., EC 180 or other suitable processor component. In another exemplary embodiment, a display brightness light sensor (e.g., photo diode) may be alternatively or additionally provided to ALS 180 that is configured to monitor brightness of the display 125 itself, and in such an embodiment the information handling system may be configured to adjust brightness of the display in real time based on feedback signal of the brightness level monitored by the display brightness light sensor (e.g., to increase display brightness when the detected display brightness is less than a desired brightness level set point and/or to decrease display brightness when the detected display brightness is greater than a desired brightness level set point).

Information handling system 100 may be in turn configured to automatically provide increased display brightness from display 125 when the display is exposed to higher ambient brightness levels (e.g., such as when exposed to bright artificial office or other types of lights, outdoors in sunlight, etc.), and to provide decreased display brightness from display 125 when the display is exposed to lower ambient brightness levels (e.g., such as indoors in an office of home environment). This may be accomplished, for example, by lighting both CCFL backlights 170a and 170b when the ALS 180 detects higher ambient brightness levels, and by lighting only one of CCFL backlights 170a or 170b when the ALS 180 detects lower ambient brightness levels. It will be understood that the configuration of FIG. 1A is exemplary only, and that an ALS 180 may be positioned in any other location that is suitable for detecting ambient light conditions to which information handling system 100 and/or a user of same is exposed. Further information on inverter control and ALS configuration may be found in U.S. patent application Ser. No. 11/145,638, published as United States Patent Application Publication No. 2006/0274023, which is incorporated herein by reference in its entirety.

Figure 1B:
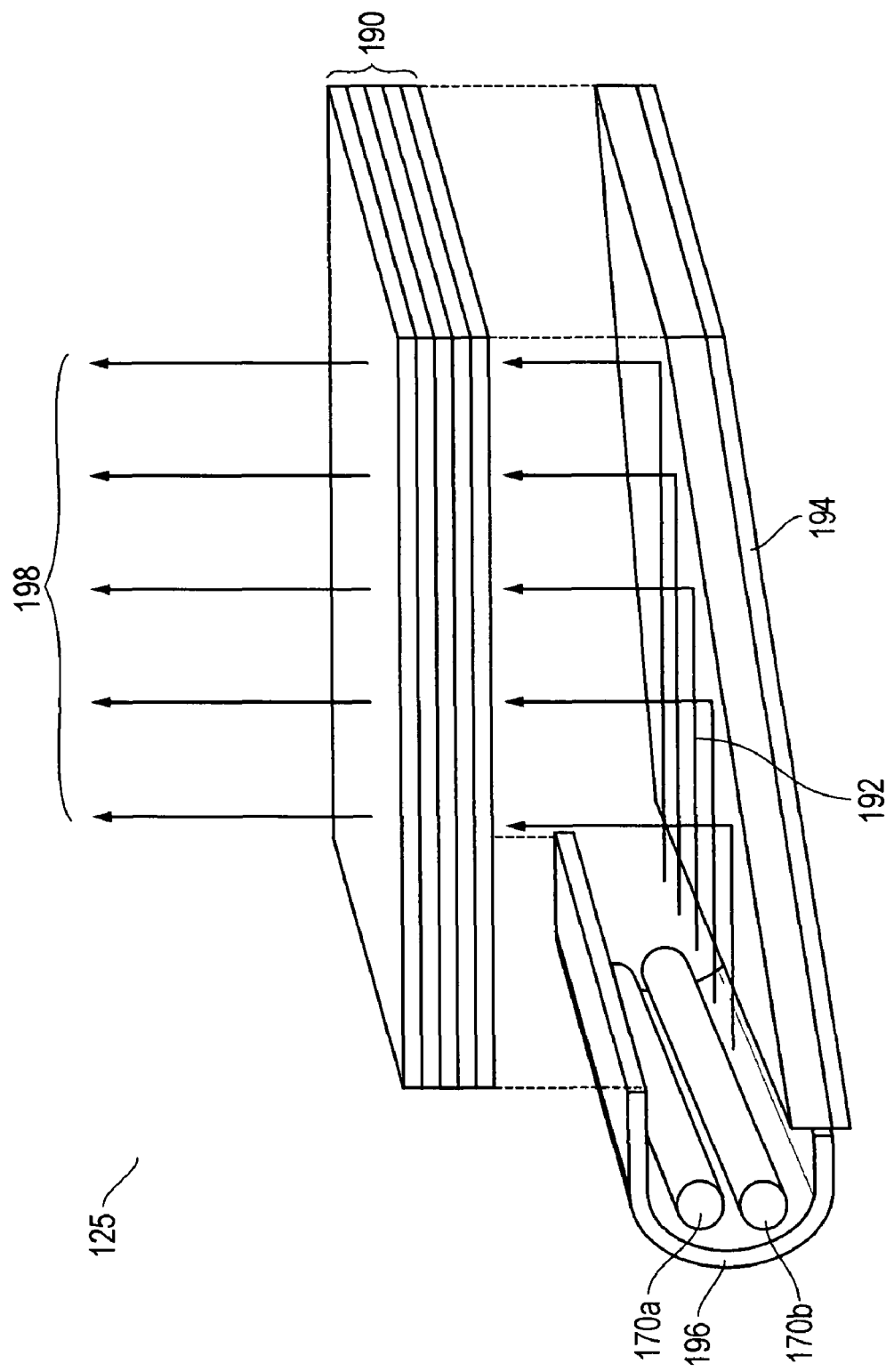
FIG. 1B is an exploded simplified view of a display as it may be configured according to one exemplary embodiment of the disclosed systems and methods.

FIG. 1B shows an exploded simplified view of display 125 as it may be configured in one exemplary embodiment, e.g., such as for a notebook computer display or display for other type of battery-powered portable information handling system. In this embodiment, display 125 is configured with transmissive display panel 190 that may be, for example, an LCD display panel that includes multiple layers (e.g., input diffuser layer, inner polarizer layer, LCD layer, outer polarizer layer, etc.). In this embodiment, display 125 includes multiple backlight lamps 170 that are longitudinally oriented along the periphery of one side of display 125 as shown. In the illustrated embodiment, multiple backlight lamps include two lamps 170a and 170b that are oriented in a Z-stack configuration, it being understood that more than two lamps may be present and/or that other lamp configurations may be employed.

In one embodiment, multiple backlight lamps may be configured to backlight a display panel in any configuration that allows all of the multiple backlight lamps to be simultaneously lit in order to light the display panel in a substantially uniform manner (i.e., so that light is distributed substantially evenly across the display panel without bright panel areas or dark panel areas), and that also allows any single one (or other portion) of the multiple backlight lamps to be lit by itself alone to light the display panel in a substantially uniform manner. Such an embodiment may be further characterized in that only the brightness magnitude of the display panel (and not the brightness uniformity across the area of the display panel) varies as the number of backlights that are lit is varied.

Still referring to FIG. 1B, backlight lamps 170a and 170b provide light 198 to illuminate a light pipe area 192 that is backed by a reflective sheet 194 that is angled to reflect and redirect the light 198 through transmissive display panel 190 as shown by the arrows in FIG. 1B. As shown, a reflective backing layer 196 may be present behind backlight lamps 170a and 170b to reflect therefrom into light pipe area 192. It will be understood that FIG. 1B is exemplary only, and that other display and backlight lamp configurations may be employed in the practice of the disclosed systems and methods.

Figure 2:
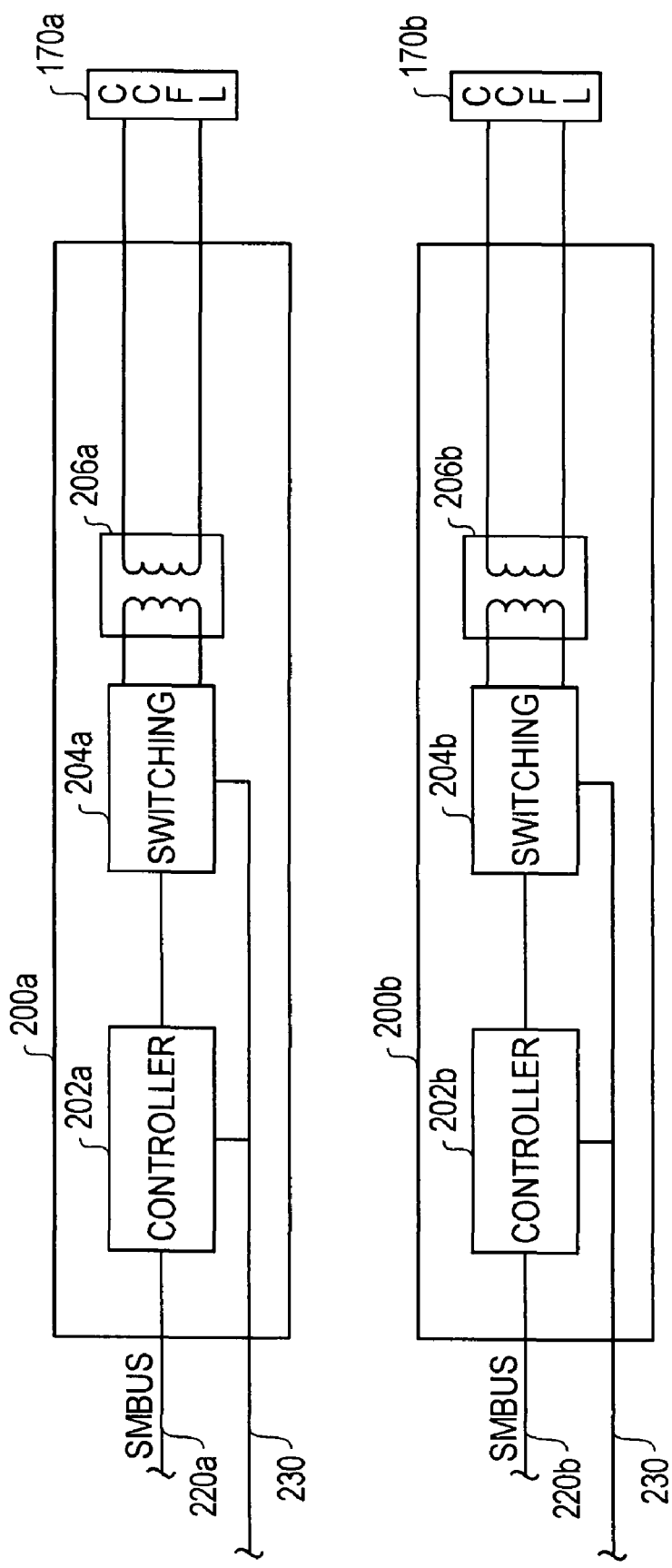
FIG. 2 is a simplified block diagram of two separate inverters as they may be configured to independently drive multiple CCFL backlights according to one exemplary embodiment of the disclosed systems and methods.

FIG. 2 illustrates inverter circuitry that includes two separate inverter devices 200a and 200b as they may be employed to independently drive CCFL backlights 170a and 170b of display 125 according to one exemplary embodiment. As shown, each of inverters 200a and 200b includes a transformer 206a or 206b that is coupled to provide alternating current to a respective CCFL backlight 170a or 170b of display 125 as shown. Each of inverters 200a and 200b also includes switching elements 204a or 204b (e.g., MOSFET transistors) that are controlled by an inverter controller 202a or 202b to provide direct current from power source 230 in alternating directions to a primary winding of the respective transformer 206a or 206b so as to produce alternating current in a secondary winding of the transformer 206a or 206b. As shown, alternating current produced by transformer 206a of inverter 200a is provided to CCFL backlight 170a, and alternating current produced by transformer 206b of inverter 200b is provided to CCFL backlight 170b. It will be understood that components of inverters 200a and 200b may be provided in separate packages, or may be integrated together as part of a single package. Further information on inverters and CCFL display backlights may be found in U.S. patent application Ser. No. 10/875,354 published as United States Patent Application Publication US 2005/0285546, which is incorporated herein by reference.

Also shown in FIG. 2 is system management bus (SMBus) connection 220a to controller 202a of inverter 200a, and a SMBus connection 220b to controller 202b of inverter 200b. In this embodiment, each of inverters 200a and 200b have different SMBus addresses so that each of controllers 202a and 202b may be independently controlled by digital command signals (e.g., controlled by system BIOS and received across SMBus from embedded controller) to independently drive CCFL backlights 170a and 170b. For example, a selected one of CCFL backlights 170a or 170b may be illuminated while the other one of CCFL backlights 170a or 170b is not illuminated (e.g., to implement an indoor viewing or battery optimized mode), both CCFL backlights 170a and 170b may be illuminated (e.g., to implement external AC power mode or a performance mode for outdoor viewing, viewing under bright artificial lights, gaming applications, etc.), or each of CCFL backlights 170a and 170b may be illuminated at different brightness levels (e.g., to implement a custom display brightness mode based on user selection). Using the embodiment of FIG. 2, each inverter 200 and its respective coupled CCFL backlight 170 is capable of independent operation, and thus may continue operation even in the event of a failure of the other inverter 200 and/or its coupled CCFL backlight 170. It will also be understood that a display 125 may be provided with three or more CCFL backlights 170 that may be independently driven by providing three or more separate inverters 200 (each coupled to drive a respective CCFL backlight) that each have their own SMBus address.

FIG. 3 illustrates another exemplary embodiment in which inverter circuitry is provided as a single inverter device 200 that is integrated to include components configured to independently drive CCFL backlights 170a and 170b of display 125 using a master/slave configuration. As shown, inverter 200 includes switching elements 204a and 204b, transformer 206a that is coupled to provide alternating current to master CCFL backlight 170a of display 125, and transformer 206b that is coupled to provide alternating current to slave CCFL backlight 170b of display 125 in a manner as previously described. In this embodiment, switching elements 204a are controlled by inverter controller 202 to provide direct current from power source 230 in alternating directions to a primary winding of transformer 206a so as to produce alternating current in a secondary winding of transformer 206a, which is in turn provided to master CCFL backlight 170a. Under the control of inverter controller 202, a portion of switching elements 204a (e.g., two switches out of the four switches of a full bridge that is provided for master CCFL backlight 170a) may be shared and used in combination with switching elements 204b (e.g., two of the switches of switching elements 204a may be combined with two additional switches of switching elements 204b to make an additional full bridge for slave CCFL backlight 170b, thus requiring a total of six switches instead of eight switches) to independently provide direct current from power source 230 in alternating directions to a primary winding of transformer 206b so as to produce alternating current in a secondary winding of transformer 206b, which is in turn provided to independently drive and light slave CCFL backlight 170b in a manner that is separate from master CCFL backlight 170a.

Using the configuration of FIG. 3, master CCFL backlight 170a may be selectably lit by inverter controller 202 that controls switching elements 204a and transformer 206a. Due to switching component integration, slave CCFL backlight 170b in turn may be selectably lit by inverter controller 202 by controlling switching elements 204b and transformer 206b as long as switching elements 204a, transformer 206a and CCFL 170a are functional (i.e., existing in a non-failure mode) to permit or prevent flow of current from transformer 206b to slave CCFL backlight 170b in a manner that is independent of current flow from transformer 206a to master CCFL backlight 170a. Controller 202 receives command signals from display controller 120 to light both CCFL backlights 107a and 107b, or to only light master CCFL backlight 107a.

In the embodiment of FIG. 3, no current is provided to light slave CCFL backlight 170b when any one or more of master CCFL backlight 170a, switching elements 204a, or transformer 206a is in a failure mode, although slave CCFL backlight 170a may be selectably lit at any time that master CCFL backlight 170a is functional and not in a failure mode. Using this configuration, the number of inverter components required to interpedently drive CCFL backlights 170a and 170b may be advantageously minimized, e.g., by reducing the required number of switches to complete two full bridge circuits from eight switches to six, also reducing the number of drivers and complexity of the controller. It will also be understood that a display 125 may be provided with a master CCFL backlight in addition to two or more slave CCFL backlights that are each controlled using a respective shared switch elements 204 in a manner similar to that described for FIG. 3 to provide the display with three of more CCFL backlights that may be independently driven, and so that the master CCFL backlights acts is functional even when one or more of the slave CCFL backlights have failed, but in which both master and slave backlights are not functional in the event of a master backlight failure.

A large amount of integration is made possible if the lamps are configured in a master/slave configuration such as FIG. 3, i.e., such that the Master lamp is always on if the LCD is on but the Slave lamp can be turned on and off separately depending on desired brightness needed. In this regard, the master/slave configuration offers the benefit of having fewer components as compared to a configuration that includes a separate drive function for each lamp. Further, the master lamp is capable of continued operation in the event of a failure (e.g., open or short) in the circuitry of the slave lamp, with both lamps only being disabled in the event of a failure in the circuitry of the master lamp.

FIG. 4 illustrates another exemplary embodiment in which inverter circuitry is provided as a single inverter device 200 that is integrated to include components configured to independently drive CCFL backlights 170a and 170b of display 125 using separate switching elements 204a and 204b coupled to respective separate transformers 206a and 206b, which are in turn coupled to independently drive CCFL backlights 170a and 170b. In the embodiment of FIG. 4, inverter controller 202 may be used to control switching elements 204a and 204b to selectably light either or both of master CCFL backlights 170a or 170b at the same time.

Using the embodiment of FIG. 4, an inverter configuration is provided that has separate drive functions with no integration so that the inverter may continue operation if one of the CCFLs faults open or shorts, regardless of which one of the two lamp goes out. This is in contrast to the master/slave configuration of FIG. 3, in which the inverter would only be able to continue operation if the fault occurred on the slave lamp (i.e., a fault on the master would shut both lamps off). It will also be understood that a display 125 may be provided with three or more CCFL backlights that are each independently driven by a separate switching element 204 and transformer 206 which are all controlled by a single inverter controller 202.

Figure 5:
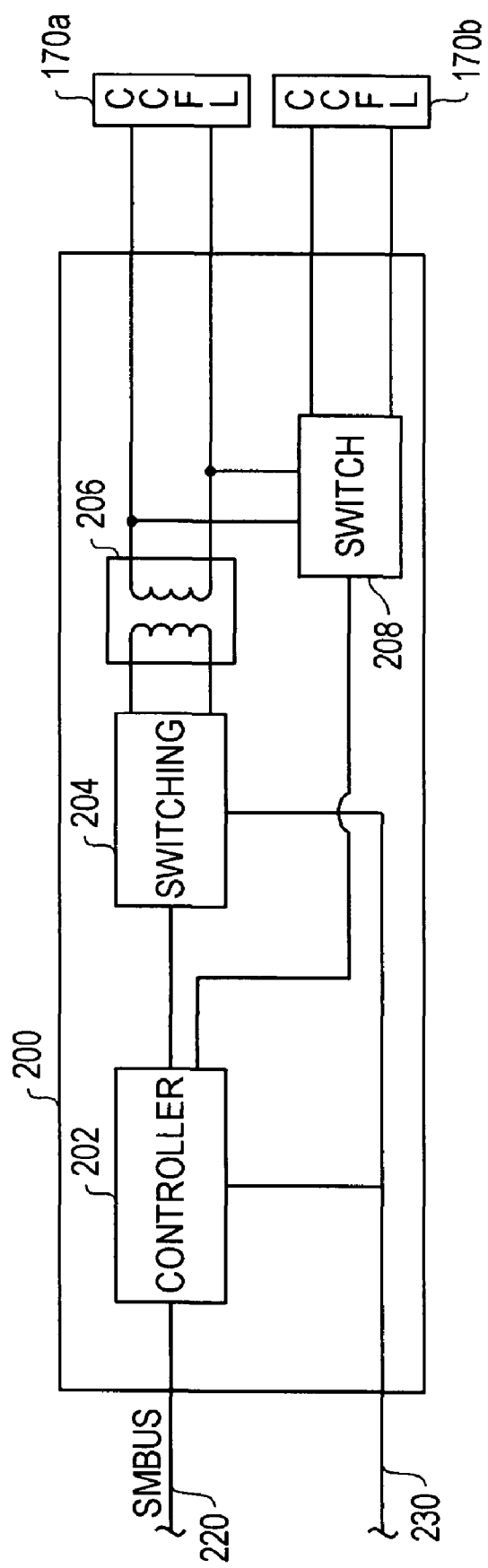
FIG. 5 is a simplified block diagram of a single inverter as it may be configured to independently drive multiple CCFL backlights according to one exemplary embodiment of the disclosed systems and methods.

FIG. 5 illustrates another exemplary embodiment in which a single inverter 200 may be used to independently drive CCFL backlights 170a and 170b of display 125 using another embodiment of master/slave configuration. As shown, inverter 200 includes switching elements 204 and single transformer 206 that is coupled to provide alternating current to master CCFL backlight 170a of display 125 in a manner as previously described. Transformer 206 is also shown coupled to provide alternating current to slave CCFL backlight 170b via high voltage switch 208 integrated as part of inverter 200 and that is controlled by inverter controller 202 to selectably permit and prevent flow of alternating current to slave CCFL backlight 170b. Using the configuration of FIG. 5, master CCFL backlight 170a may be selectably lit by inverter controller 202 that controls switching elements 204 and transformer 206. Slave CCFL backlight 170b in turn may be selectably lit whenever transformer 206 is supplying current to light master CCFL backlight 170a using high voltage switch 208 that is controlled by controller 202 to permit or prevent flow of current to slave CCFL backlight 170b. Controller 202 receives commands from display controller 120 to light both CCFL backlights 107a and 107b, or to only light master CCFL backlight 107a.

In the embodiment of FIG. 5, no current is provided to light slave CCFL backlight 170b when no current is provided to light master CCFL backlight 170a, although slave CCFL backlight 170b may be selectably lit (i.e., turned on or off) at any time that master CCFL backlight 170a is also provided with current. Using this configuration, the number of inverter components required to independently drive CCFL backlights 170a and 170b may be advantageously minimized. It will also be understood that a display 125 may be provided with a master CCFL backlight in addition to two or more slave CCFL backlights that are each coupled in parallel to master CCFL backlight 170a and that are each controlled using a respective high voltage switch 208 in a manner similar to that described for FIG. 5 to provide the display with three or more CCFL backlights that may be independently driven.

In the practice of the disclosed systems and methods, a display may also be provided with multiple backlights that are independently driven by an inverter having an external interface and no digital interface, but otherwise configured, for example, in a manner similar to configurations of FIGS. 2-5. For example, an inverter controller may receive commands via analog input pins of the inverter controller, which in turn controls its switching elements to cause its transformer/s to produce alternating current to respective CCFL backlights 170a and 170b in a manner similar to that previously described.

FIG. 6 illustrates three different CCFL lamp configurations, and tested or estimated characteristics of same when employed in a 14.1" wide extended graphics array (WXGA) notebook computer LCD display. In this regard, FIG. 6 shows specifications for a conventional basic single CCFL display, and for displays with two possible dual-CCFL configurations (i.e., Y-Stack and Z-Stack configurations) that may be employed in the practice of the disclosed systems and methods. As shown in FIG. 6, a single CCFL produces 220 nits brightness. In contrast, the two CCFLs of a Y-stack configuration may be independently driven to produce 170 nits (only the rear Y-stack CCFL lit), 215 nits (only the front Y-stack CCFL lit), and 330 nits brightness (both Y-stack CCFLs lit). Using an optional bright reflector 360 nits display brightness may be achieved with both Y-stack CCFLs lit, and using an optional polarization film (PCF), 450 nits display brightness may be achieved. For a Z-stack configuration, 440 nits of brightness may be achieved with both CCFLs lit. In this regard, the "side by side" orientation of the CCFLs in the Z-stack configuration maximizes brightness achieved from each CCFL since neither lamp blocks the other, allowing the use of one lamp only without any degradation of performance other than maximum brightness that can be achieved with one backlight lamp versus two.

As previously described, one or more inverter/s may be provided that are capable of independently driving two CCFLs in a display separately such that one lamp may be turned off when it is not needed or so that the two lamps may be driven at different brightness levels from each other to allow significant efficiency improvements. In this regard, preliminary testing has shown that an efficiency gain of about 14% at low brightness is possible in one exemplary embodiment with independent lamp control (see Table 2 below) provided by two inverters as compared to a normal configuration of a single two lamp inverter without independent lamp control (see Table 1 below).

TABLE 1

Two Lamp Configuration with Non-Independent Lamp Control
1 PWM, 1 X'RMR to 2 Lamps

| Brightness (nits) | Volts in | Current in (Amps) | SMBus Data | Power in (Watts) | Number of Lamps Lit |
|---|---|---|---|---|---|
| 50.36 | 14 | 0.12 | 0X2C | 1.68 | 2 Lamps |
| 99.42 | 14 | 0.18 | 0X43 | 2.52 | On |
| 149.5 | 14 | 0.228 | 0X55 | 3.192 | |
| 199.8 | 14 | 0.27 | 0X65 | 3.78 | |
| 249.8 | 14 | 0.31 | 0X75 | 4.34 | |
| 299.9 | 14 | 0.351 | 0X86 | 4.914 | |
| 349.5 | 14 | 0.392 | 0X98 | 5.488 | |
| 400.9 | 14 | 0.436 | 0XAC | 6.104 | |
| 452.4 | 14 | 0.481 | 0XC3 | 6.734 | |
| 503.4 | 14 | 0.53 | 0XDC | 7.42 | |
| 552.1 | 14 | 0.578 | 0XF9 | 8.092 | |

TABLE 2

Two Lamp Configuration with Independent Lamp Control
2 PWM, 2 X'RMR to 2 Lamps

| Brightness (nits) | Volts in | Current in (Amps) | SMBus Data | Power in (Watts) | Number of Lamps Lit | Difference in Power Compared to Non-Independent Lamp Control (Watts) | Percent Power saving compared to Non-Independent Lamp Control |
|---|---|---|---|---|---|---|---|
| 50.21 | 14 | 0.103 | 0X48 | 1.442 | 1 Lamp | 0.238 | 14.17% |
| 99.74 | 14 | 0.154 | 0X6A | 2.156 | On, | 0.364 | 14.44% |
| 151 | 14 | 0.198 | 0X98 | 2.772 | 1 Lamp | 0.42 | 13.16% |
| 200.8 | 14 | 0.238 | 0XA6 | 3.332 | Off | 0.448 | 11.85% |
| 250.9 | 14 | 0.279 | 0XC6 | 3.906 | | 0.434 | 10.00% |
| 300.8 | 14 | 0.323 | 0XEA | 4.522 | | 0.392 | 7.98% |
| 350.1 | 14 | 0.393 | 0X8A | 5.502 | 2 Lamps | -0.014 | -0.26% |
| 401.4 | 14 | 0.441 | 0X9E | 6.174 | On | -0.07 | -1.15% |
| 449.2 | 14 | 0.489 | 0XB2 | 6.846 | | -0.112 | -1.66% |
| 501.9 | 14 | 0.544 | 0XCF | 7.616 | | -0.196 | -2.64% |
| 550.4 | 14 | 0.593 | 0XE9 | 8.302 | | -0.21 | -2.60% |

As may be seen from comparing the data of Tables 1 and 2, at lower brightness levels, two lamps operate with lower efficiency and consume more power than a single lamp operating at the same brightness level. Therefore, when a battery-powered portable information handling system (e.g., notebook computer) is operating with a battery default reduced brightness level (60 nits) the dual lamp/high brightness system will have a shorter operating time as compared to the single lamp/standard brightness system.

Regardless of particular hardware configuration employed, independent lamp driving control may be implemented with a multiple-backlight display in any manner suitable for achieving power savings or for otherwise providing variable brightness control for the display. In one embodiment, such independent lamp drive control capability may be managed by a processor (e.g., processor 105 of FIG. 1A) that is executing software and/or firmware that generates command signals for automatically controlling the independent driving of multiple backlight lamps, and/or for controlling the independent driving of multiple backlight lamps based on user input. Such command signals may be provided directly by the processor to inverter circuitry, or may be relayed or transferred through other control devices, e.g., through GMCH 110 and display controller 120 of FIG. 1A.

In one exemplary embodiment, battery life of an information handling system may be extended by operating a multiple-backlight display with only one backlight to light the display when maximum brightness level (e.g., of about 220 nits) or lower brightness level afforded by one backlight is acceptable the user. This feature maybe implemented, for example, as part of the battery-optimizing power scheme for a battery-powered information handling system power management utility so that when the system is operating on battery power only a single backlight of the display is lit (e.g., battery optimized mode), limiting the brightness range of the panel to the standard single lamp brightness level. In such an embodiment, a user may be optionally provided with the capability of overriding this battery power savings feature, for example, by input to the power management utility (e.g., such as using Dell Quickset application) or by Hot keys (e.g., if the user consecutively tries to increase the panel brightness using the Hot keys (Fn Up arrow)), so that the user may disable the single lamp power savings feature and allow full range of the panel brightness available from the multiple backlights of the display. In this embodiment, when operating in AC power mode (e.g., operating on AC adapter) the user may be automatically given access to the full brightness range accommodated by the multiple backlight lamps of the display accommodate.

In addition to user selection, automatic brightness control may be integrated with an optional ambient light sensor (ALS) 180 so that if the ALS 180 detects that the display of an information handling system (e.g., notebook computer) is operating with its user in a high brightness environment (e.g., such as when outdoors/sunlight or when exposed to artificial light conditions of from greater than about 1000 lux to about 100,000 lux or greater) both backlights of a dual-backlight display system operate to achieve higher brightness levels, whereas if the ALS 180 detects the display is operating with its user in a lower ambient condition (e.g., such as indoor lighting of from about 100 lux to about 1000 lux) only one backlight of the display is activated in order to achieve increased battery life. In one exemplary embodiment, a second backlight of a dual-backlight display system may be turned on in addition to an already-lit first backlight when the ambient light condition in which the display is operating with its user is detected to be from about 800 lux to about 1000 lux. It will be understood that foregoing brightness level lux values of this paragraph are exemplary only and that other brightness level values, and/or number of brightness level thresholds, may be selected as desired or needed to meet the requirements of a particular application.

In another exemplary embodiment, an information handling system may be configured to automatically switch between operating on one backlight and operating on multiple backlights depending on desired display brightness level (e.g., as may be selected by user, as determined by actual lighting conditions, as determined by display brightness level, as determined by power management mode, etc.). This automatic brightness control may be implemented using any suitable configuration, e.g., by an inverter controller, by information handling system software, etc. As an example, display brightness levels below about 220 nits may be achieved utilizing one backlight lamp, while brightness levels above about 220 nits may be achieved utilizing two or more backlight lamps regardless of whether the system is powered by battery or external power (e.g., by AC adapter).

Table 3 shows exemplary brightness steps (e.g., as may be selected by a user using Hot key/s) and the corresponding number of backlights operating for each brightness step for one exemplary embodiment of LCD display having two independently-driven CCFL backlights. Also shown are the corresponding brightness levels achieved for each brightness step. When automatic brightness control is implemented as described above, the second backlight lamp turns on at brightness level 5.

TABLE 3

| Brightness Step (e.g., via Hot Keys) | Number Of Backlights | Brightness Level (nits) |
| --- | --- | --- |
| 1 | 1 | 10 |
| 2 | 1 | 30 |
| 3 | 1 | 60 |
| 4 | 1 | 150 |
| 5 | 2 | 240 |
| 6 | 2 | 330 |
| 7 | 2 | 420 |
| 8 | 2 | 550 |

Figure 7:
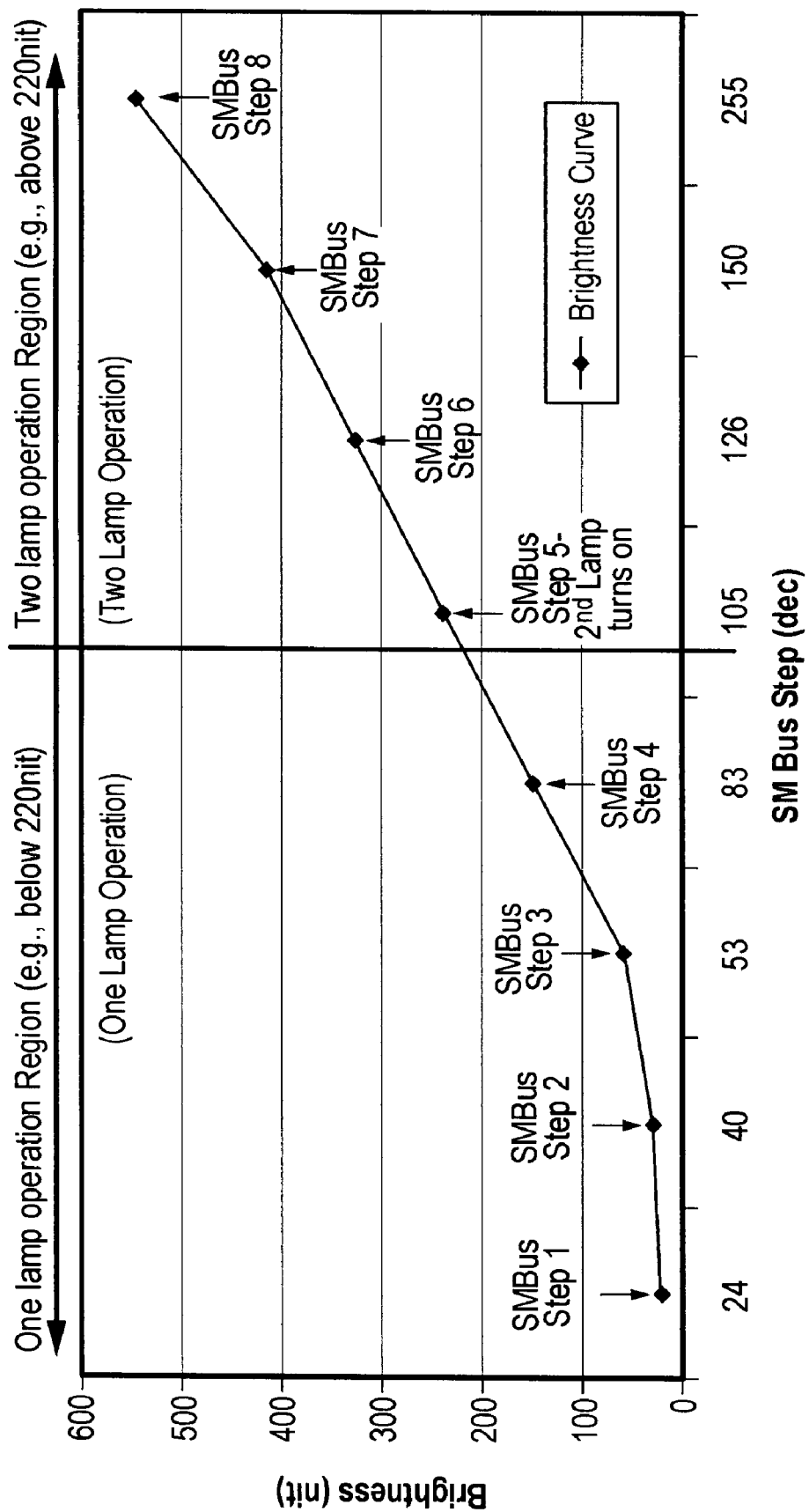
FIG. 7 illustrates display brightness values versus SMBus brightness level steps according to one exemplary embodiment of the disclosed systems and methods.

FIG. 7 illustrates display brightness values versus SMBus brightness level steps as may be achieved in one exemplary embodiment such as described above in relation to Table 3. Such an embodiment may be implemented, for example, using inverter/s with digital interfaces and individual inverter SMBus addresses that are employed to independently drive two CCFL backlights of a dual CCFL backlight display, e.g., based on power management mode, user input, and/or sensed brightness level. In one exemplary embodiment, a controller 202 may be used to provide a digital interface that accepts the SMBus command signals to vary brightness of each CCFL backlight. In this regard, the controller 202 may be configured with multiple pre-existing brightness steps which are selected based on SMBus input. Alternatively, brightness level steps may be communicated to an analog interface of an inverter (e.g., having no digital interface) using pulse width modulated ("PWM") signal amplitude to specify desired brightness of a CCFL light.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. An information handling system, comprising:
   a transmissive display panel;
   multiple backlight lamps configured to light said transmissive display panel;
   inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and
   at least one processor configured to control said inverter circuitry to cause said first transformer of said inverter circuitry to provide AC current to drive said first one of said multiple backlight lamps in a manner that is independent of AC current provided by said second transformer of said inverter circuitry to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlight lamps.

2. The information handling system of claim 1, wherein said transmissive display panel comprises a liquid crystal display (LCD) panel; and wherein each of said multiple backlight lamps comprises a cold cathode fluorescent lamp (CCFL).

3. The information handling system of claim 1, wherein said information handling system comprises a component of a battery-powered portable information handling system; and wherein said DC current is provided by a battery of said battery-powered portable information handling system.

4. The information handling system of claim 1, wherein said inverter circuitry comprises a first inverter device and a second and separate inverter device, said first inverter device comprising said first transformer and said second inverter device comprising said second transformer.

5. The information handling system of claim 1, wherein said inverter circuitry comprises a single inverter device that comprises said first transformer and said second transformer.

6. The information handling system of claim 1, further comprising at least one processor configured to automatically control said inverter circuitry to cause said first transformer of said inverter circuitry to provide AC current to selectably light or vary the brightness level of said first one of said multiple backlight lamps in a manner that is independent from AC current provided by said second transformer of said inverter circuitry to said second one of said multiple backlight lamps.

7. An information handling system, comprising:
   a transmissive display panel;
   multiple backlight lamps configured to light said transmissive display panel;
   inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and p1 at least one processor configured to control said inverter circuitry to cause said first transformer of said inverter circuitry to provide AC current to drive said first one of said multiple backlight lamps in a manner that is independent of AC current provided by said second transformer of said inverter circuitry to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlight lamps;
   wherein the at least one processor is configured to control said inverter circuitry in response to user input to cause said first transformer of said inverter circuitry to provide AC current to selectably light or vary the brightness level of said first one of said multiple backlight lamps in a manner that is independent from AC current provided by said second transformer of said inverter circuitry to drive said second one of said multiple backlight lamps.

8. An information handling system, comprising:
   a transmissive display panel;
   multiple backlight lamps configured to light said transmissive display panel;
   inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and
   at least one processor configured to control said inverter circuitry to cause said first transformer of said inverter circuitry to provide AC current to drive said first one of said multiple backlight lamps in a manner that is independent of AC current provided by said second transformer of said inverter circuitry to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlight lamps;
   wherein said inverter circuitry comprises at least one inverter device that includes at least one controller coupled to receive digital command signals, said at least one controller configured to respond to said digital command signals by causing said first and second transformers to provide AC current to drive said respective first one and second one of said multiple backlights in a manner that is independent of each other.

9. An information handling system, comprising:

a transmissive display panel;

multiple backlight lamps configured to light said transmissive display panel;

inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and at least one processor configured to control said inverter circuitry to cause said first transformer of said inverter circuitry to provide AC current to drive said first one of said multiple backlight lamps in a manner that is independent of AC current provided by said second transformer of said inverter circuitry to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlight lamps;

wherein said information handling system comprises a battery-powered portable information handling system including at least one processor; wherein said DC current is provided by a battery of said battery-powered portable information handling system; and wherein said at least one processor is configured to selectably provide AC current to drive said first one of said multiple backlight lamps in a manner that is independent from AC current provided to drive said second one of said multiple backlight lamps based on a remaining capacity of said battery supplying DC current to said information handling system to light both of said first and second backlight lamps when a capacity of said battery is greater than or equal to a selected battery capacity threshold level; and to light only said first backlight lamp when a capacity of said battery is below said battery capacity threshold level.

10. The information handling system of claim 9, wherein said processor is configured to automatically control said inverter circuitry to light both of said first and second backlight lamps when a capacity of said battery is greater than or equal to a selected threshold battery voltage; and wherein said processor is configured to automatically control said inverter circuitry to light only said first backlight lamp when a capacity of said battery is below said battery voltage threshold.

11. An information handling system, comprising:

a transmissive display panel;

multiple backlight lamps configured to light said transmissive display panel;

inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and at least one processor configured to control said inverter circuitry to cause said first transformer of said inverter circuitry to provide AC current to drive said first one of said multiple backlight lamps in a manner that is independent of AC current provided by said second transformer of said inverter circuitry to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlight lamps;

wherein said information handling system comprises a battery-powered portable information handling system including at least one processor; wherein said information handling system is configured to receive DC current from an AC adapter device coupled to said information handling system; and wherein said at least one processor is configured to automatically control said inverter circuitry based on whether or not DC current is provided to said information handling system by said AC adapter device to cause said first transformer to selectably provide AC current to drive said first one of said multiple backlight lamps in a manner that is independent from AC current provided by said second transformer of said inverter circuitry to drive said second one of said multiple backlight lamps.

12. The information handling system of claim 11, wherein said processor is configured to automatically control said inverter circuitry to light both of said first and second backlight lamps when DC current is provided to said information handling system by said AC adapter device, and wherein said processor is configured to automatically control said inverter circuitry to light only said first backlight lamp when no DC current is provided to said information handling system by said AC adapter device.

13. An information handling system, comprising:

a transmissive display panel;

multiple backlight lamps configured to light said transmissive display panel;

inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and at least one processor configured to control said inverter circuitry to cause said first transformer of said inverter circuitry to provide AC current to drive said first one of said multiple backlight lamps in a manner that is independent of AC current provided by said second transformer of said inverter circuitry to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlight lamps;

wherein said information handling system further comprises at least one processor; and wherein said processor is configured to automatically control said inverter circuitry in response to at least one of a detected brightness level of the ambient light environment in which the information handling system is operating or a monitored feed-back brightness level of said transmissive display panel to cause said first transformer to selectably provide AC current to drive said first one of said multiple backlight lamps in a manner that is independent from AC current provided by said second transformer of said inverter circuitry to drive said second one of said multiple backlight lamps.

14. An information handling system, comprising:
a transmissive display panel;
multiple backlight lamps configured to light said transmissive display panel;
inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and
at least one processor configured to control said inverter circuitry to cause said first transformer of said inverter circuitry to provide AC current to drive said first one of said multiple backlight lamps in a manner that is independent of AC current provided by said second transformer of said inverter circuitry to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlight lamps;
wherein said information handling system further comprises at least one processor; wherein said information handling system is pre-programmed with a display brightness profile; and wherein said processor is configured to automatically control said inverter circuitry based on said display brightness profile to set a brightness level of said transmissive display panel by selectably providing AC current to drive said first one of said multiple backlight lamps in a manner that is independent from AC current provided by said second transformer of said inverter circuitry to drive said second one of said multiple backlight lamps.

15. A method of operating an information handling system, comprising:
providing an information handling system that comprises a transmissive display panel, and multiple backlight lamps configured to light said transmissive display panel; and
selectably providing AC current to drive a first one of said multiple backlight lamps in a manner that is independent from providing AC current to drive a second one of said multiple backlight lamps based on at least one of a remaining capacity of a battery supplying DC current to said information handling system, based on whether or not DC current is provided to said information handling system by an AC adapter device, based on a detected brightness level of the ambient light environment in which said information handling system is operating, based on a monitored feed-back brightness level of said transmissive display, based on a pre-programmed display brightness profile, or a combination thereof;
wherein selectably providing AC current to drive a first one of said multiple backlight lamps in a manner that is independent from providing AC current to drive a second one of said multiple backlight lamps based on remaining capacity of a battery supplying DC current to said information handling system comprises supplying DC current to said information handling system to light both of said first and second backlight lamps when a capacity of said battery is greater than or equal to a selected battery capacity threshold level; and to light only said first backlight lamp when a capacity of said battery is below said battery capacity threshold level.

16. A method of operating an information handling system, comprising:
providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
independently driving said first one of said multiple backlight lamps by using said processor to cause said first transformer to provide AC current from said first transformer to drive said first one of said multiple backlights backlight lamps in a manner that is independent of AC current provided by said second transformer to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlights backlight lamps.

17. The method of claim 16, wherein said information handling system comprises a battery-powered portable information handling system; wherein said DC current is provided by a battery of said battery-powered portable information handling system; wherein said transmissive display panel comprises a liquid crystal display (LCD) panel; and wherein each of said multiple backlight lamps comprises a cold cathode fluorescent lamp (CCFL).

18. The method of claim 16, further comprising using said processor to cause said first transformer to provide AC current to selectably light or vary the brightness level of said first one of said multiple backlight lamps in a manner that is independent from AC current provided by said second transformer to said second one of said multiple backlight lamps.

19. A method of operating an information handling system, comprising:
providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
independently driving said first one of said multiple backlight lamps by using said processor to cause said first transformer to provide AC current from said first transformer to drive said first one of said multiple backlights backlight lamps in a manner that is independent of AC current provided by said second transformer to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlights backlight lamps;
wherein said information handling system comprises a battery-powered portable information handling system; wherein said method further comprises using said processor to cause said first transformer to provide AC current to light said first backlight lamp and using said processor to cause said second transformer to provide AC current to light said second backlight lamp so that both first and second backlight lamps are simultaneously lit when a capacity of said battery is greater than or equal to a selected threshold battery voltage; and wherein said method further comprises using said processor to cause only said first transformer to provide AC current to light said first backlight lamp so that only said first backlight lamp is lit when a capacity of said battery is below said battery voltage threshold.

20. A method of operating an information handling system, comprising:
providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
independently driving said first one of said multiple backlight lamps by using said processor to cause said first transformer to provide AC current from said first transformer to drive said first one of said multiple backlights backlight lamps in a manner that is independent of AC current provided by said second transformer to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlights backlight lamps;
wherein said information handling system comprises a battery-powered portable information handling system configured to receive DC current from an AC adapter device coupled to said information handling system; wherein said method further comprises using said processor to cause said first transformer to provide AC current to light said first backlight lamp and using said processor to cause said second transformer to provide AC current to light said second backlight lamp so that both first and second backlight lamps are simultaneously lit when DC current is provided to said information handling system by said AC adapter device; and wherein said method further comprises using said processor to cause only said first transformer to provide AC current to light said first backlight lamp so that only said first backlight lamp is lit when no DC current is provided to said information handling system by said AC adapter device.

21. A method of operating an information handling system, comprising:
providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
independently driving said first one of said multiple backlight lamps by using said processor to cause said first transformer to provide AC current from said first transformer to drive said first one of said multiple backlights backlight lamps in a manner that is independent of AC current provided by said second transformer to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlights backlight lamps;
wherein said method further comprises at least one of detecting a brightness level of the ambient light environment in which the information handling system is operating or monitoring a feed-back brightness level of said transmissive display panel; and using said processor to cause said first transformer to selectably provide AC current based on at least one of said detected brightness level or said monitored feed-back brightness level of said transmissive display panel to drive said first one of said multiple backlight lamps in a manner that is independent from AC current provided by said second transformer of said inverter circuitry to drive said second one of said multiple backlight lamps.

22. A method of operating an information handling system, comprising:
providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
independently driving said first one of said multiple backlight lamps by using said processor to cause said first transformer to provide AC current from said first transformer to drive said first one of said multiple backlights backlight lamps in a manner that is independent of AC current provided by said second transformer to drive said second one of said multiple backlight lamps so as to selectably light only said first one of said multiple backlight lamps while not lighting said second one of said multiple backlight lamps, and so as to selectably drive said first one of said multiple backlight lamps to be a different brightness level than said second one of said multiple backlights backlight lamps;
wherein said method further comprises providing said information handling system with a pre-programmed display brightness profile; and using said processor to set a brightness level of said transmissive display panel by causing said first transformer to selectably provide AC current based on said pre-programmed display brightness profile to drive said first one of said multiple backlight lamps in a manner that is independent from AC current provided by said second transformer of said inverter circuitry to drive said second one of said multiple backlight lamps.

23. An information handling system, comprising:
a transmissive display panel;
multiple backlight lamps configured to light said transmissive display panel;
inverter circuitry configured to convert DC current to AC current, said inverter circuitry comprising:
a transformer coupled to provide said AC current to a first and a second one of said multiple backlight lamps, and
a switch coupled between said transformer and said second one of said multiple backlight lamps, said switch configured to be controlled to selectably permit and prevent flow of AC current from said transformer to said second one of said multiple backlight lamps at the same time that AC current is flowing from said transformer to said first one of said multiple backlight lamps; and
at least one processor configured to control said switch of said inverter circuitry to cause AC current to drive said second one of said multiple backlights in a manner that is independent of AC current provided by said transformer of said inverter circuitry to drive said first one of said multiple backlight lamps.

24. The information handling system of claim 23, wherein said transmissive display panel comprises a liquid crystal display (LCD) panel; wherein each of said multiple backlight lamps comprises a cold cathode fluorescent lamp (CCFL); wherein said information handling system comprises a component of a battery-powered portable information handling system; and wherein said DC current is provided by a battery of said battery-powered portable information handling system.

25. A method of operating an information handling system, comprising:
providing an information handling system that comprises:
a transmissive display panel,
multiple backlight lamps configured to light said transmissive display panel,
an inverter that comprises a transformer coupled to first and second ones of said multiple backlight lamps and a switch coupled between said transformer and said second one of said multiple backlight lamps, and
at least one processor; and
independently driving said first one of said multiple backlight lamps by using said processor to control said switch of said inverter circuitry to selectably permit and prevent flow of AC current from said transformer to said second one of said multiple backlight lamps at the same time that AC current is flowing from said transformer to said first one of said multiple backlight lamps to drive said second one of said multiple backlights in a manner that is independent of AC current provided by said transformer of said inverter circuitry to drive said first one of said multiple backlight lamps.

26. The method of claim 25, wherein said information handling system comprises a battery-powered portable information handling system; wherein said DC current is provided by a battery of said battery-powered portable information handling system; wherein said transmissive display panel comprises a liquid crystal display (LCD) panel; and wherein each of said multiple backlight lamps comprises a cold cathode fluorescent lamp (CCFL).

27. An information handling system, comprising:
a transmissive display panel;
multiple backlight lamps configured to light said transmissive display panel;
inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and
at least one processor configured to control said inverter circuitry to cause said first transformer of said inverter circuitry to provide AC current to drive said first one of said multiple backlights in a manner that is independent of AC current provided by said second transformer of said inverter circuitry to drive said second one of said multiple backlight lamps; and
at least one processor configured to control said inverter circuitry in response to user input to cause said first transformer of said inverter circuitry to provide AC current to selectably light or vary the brightness level of said first one of said multiple backlight lamps in a manner that is independent from AC current provided by said second transformer of said inverter circuitry to drive said second one of said multiple backlight lamps.

28. An information handling system, comprising:
a transmissive display panel;
multiple backlight lamps configured to light said transmissive display panel;
inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and
at least one processor configured to control said inverter circuitry to cause said first transformer of said inverter circuitry to provide AC current to drive said first one of said multiple backlights in a manner that is independent of AC current provided by said second transformer of said inverter circuitry to drive said second one of said multiple backlight lamps;
wherein said inverter circuitry comprises at least one inverter device that includes at least one controller coupled to receive digital command signals, said at least one controller configured to respond to said digital command signals by causing said first and second transformers to provide AC current to drive said respective first one and second one of said multiple backlights in a manner that is independent of each other.

29. An information handling system, comprising:
a transmissive display panel;
multiple backlight lamps configured to light said transmissive display panel;
inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and
at least one processor configured to control said inverter circuitry to cause said first transformer of said inverter circuitry to provide AC current to drive said first one of said multiple backlights in a manner that is independent of AC current provided by said second transformer of said inverter circuitry to drive said second one of said multiple backlight lamps;
wherein said information handling system comprises a battery-powered portable information handling system including at least one processor; wherein said DC current is provided by a battery of said battery-powered portable information handling system; and wherein said at least one processor is configured to automatically control said inverter circuitry based on a remaining capacity of said battery to cause said first transformer to selectably provide AC current to drive said first one of said multiple backlight lamps in a manner that is independent from AC current provided by said second transformer of said inverter circuitry to drive said second one of said multiple backlight lamps; and
wherein said processor is configured to automatically control said inverter circuitry to light both of said first and second backlight lamps when a capacity of said battery is greater than or equal to a selected threshold battery voltage; and wherein said processor is configured to automatically control said inverter circuitry to light only said first backlight lamp when a capacity of said battery is below said battery voltage threshold.

30. An information handling system, comprising:
a transmissive display panel;
multiple backlight lamps configured to light said transmissive display panel;

inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and at least one processor configured to control said inverter circuitry to cause said first transformer of said inverter circuitry to provide AC current to drive said first one of said multiple backlights in a manner that is independent of AC current provided by said second transformer of said inverter circuitry to drive said second one of said multiple backlight lamps;

wherein said information handling system comprises a battery-powered portable information handling system including at least one processor;

wherein said information handling system is configured to receive DC current from an AC adapter device coupled to said information handling system; and wherein said at least one processor is configured to automatically control said inverter circuitry based on whether or not DC current is provided to said information handling system by said AC adapter device to cause said first transformer to selectably provide AC current to drive said first one of said multiple backlight lamps in a manner that is independent from AC current provided by said second transformer of said inverter circuitry to drive said second one of said multiple backlight lamps so as to limit the brightness range of the panel when DC current is not provided to said information handling system by said AC adapter device relative to the brightness range of the panel when DC current is provided to said information handling system by said AC adapter device.

31. The information handling system of claim 30, wherein said processor is configured to automatically control said inverter circuitry to light both of said first and second backlight lamps when DC current is provided to said information handling system by said AC adapter device, and wherein said processor is configured to automatically control said inverter circuitry to light only said first backlight lamp when no DC current is provided to said information handling system by said AC adapter device.

32. An information handling system, comprising:
a transmissive display panel;
multiple backlight lamps configured to light said transmissive display panel;
inverter circuitry configured to convert DC current to AC current, said inverter circuitry comprising a first transformer coupled to provide said AC current to a first one of said multiple backlight lamps and a second transformer coupled to provide said AC current to a second one of said multiple backlight lamps; and
at least one processor configured to control said inverter circuitry to cause said first transformer of said inverter circuitry to provide AC current to drive said first one of said multiple backlights in a manner that is independent of AC current provided by said second transformer of said inverter circuitry to drive said second one of said multiple backlight lamps;
wherein said information handling system further comprises at least one processor, and wherein at least one of:
said processor is configured to automatically control said inverter circuitry in response to at least one of a detected brightness level of the ambient light environment in which the information handling system is operating or a monitored feed-back brightness level of said transmissive display panel to cause said first transformer to selectably provide AC current to drive said first one of said multiple backlight lamps in a manner that is independent from AC current provided by said second transformer of said inverter circuitry to drive said second one of said multiple backlight lamps, or
said information handling system is pre-programmed with a display brightness profile, and said processor is configured to automatically control said inverter circuitry based on said display brightness profile to set a brightness level of said transmissive display panel by selectably providing AC current to drive said first one of said multiple backlight lamps in a manner that is independent from AC current provided by said second transformer of said inverter circuitry to drive said second one of said multiple backlight lamps.

33. A method of operating an information handling system, comprising:
providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
independently driving said first one of said multiple backlight lamps by using said processor to cause said first transformer to provide AC current from said first transformer to drive said first one of said multiple backlights in a manner that is independent of AC current provided by said second transformer to drive said second one of said multiple backlight lamps;
wherein said information handling system comprises a battery-powered portable information handling system; wherein said method further comprises using said processor to cause said first transformer to provide AC current to light said first backlight lamp and using said processor to cause said second transformer to provide AC current to light said second backlight lamp so that both first and second backlight lamps are simultaneously lit when a capacity of said battery is greater than or equal to a selected threshold battery voltage; and wherein said method further comprises using said processor to cause only said first transformer to provide AC current to light said first backlight lamp so that only said first backlight lamp is lit when a capacity of said battery is below said battery voltage threshold.

34. A method of operating an information handling system, comprising:
providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
independently driving said first one of said multiple backlight lamps by using said processor to cause said first transformer to provide AC current from said first transformer to drive said first one of said multiple backlights in a manner that is independent of AC current provided by said second transformer to drive said second one of said multiple backlight lamps;
wherein said information handling system comprises a battery-powered portable information handling system configured to receive DC current from an AC adapter device coupled to said information handling system;

wherein said method further comprises using said processor to cause said first transformer to provide AC current to light said first backlight lamp and using said processor to cause said second transformer to provide AC current to light said second backlight lamp so that both first and second backlight lamps are simultaneously lit when DC current is provided to said information handling system by said AC adapter device; and wherein said method further comprises using said processor to cause only said first transformer to provide AC current to light said first backlight lamp so that only said first backlight lamp is lit when no DC current is provided to said information handling system by said AC adapter device.

35. A method of operating an information handling system, comprising:
   providing an information handling system that comprises a transmissive display panel, multiple backlight lamps configured to light said transmissive display panel, a first transformer coupled to a first one of said multiple backlight lamps, a second transformer coupled to a second one of said multiple backlight lamps, and at least one processor; and
   independently driving said first one of said multiple backlight lamps by using said processor to cause said first transformer to provide AC current from said first transformer to drive said first one of said multiple backlights in a manner that is independent of AC current provided by said second transformer to drive said second one of said multiple backlight lamps; and
   wherein said method further comprises at least one of:
      detecting a brightness level of the ambient light environment in which the information handling system is operating or monitoring a feed-back brightness level of said transmissive display panel; and using said processor to cause said first transformer to selectably provide AC current based on at least one of said detected brightness level or said monitored feed-back brightness level of said transmissive display panel to drive said first one of said multiple backlight lamps in a manner that is independent from AC current provided by said second transformer of said inverter circuitry to drive said second one of said multiple backlight lamps, or
      providing said information handling system with a pre-programmed display brightness profile; and using said processor to set a brightness level of said transmissive display panel by causing said first transformer to selectably provide AC current based on said pre-programmed display brightness profile to drive said first one of said multiple backlight lamps in a manner that is independent from AC current provided by said second transformer of said inverter circuitry to drive said second one of said multiple backlight lamps.

* * * * *